(12) United States Patent
Atzmony et al.

(10) Patent No.: US 7,873,835 B2
(45) Date of Patent: Jan. 18, 2011

(54) ACCESSING DATA STORAGE DEVICES

(75) Inventors: Yedidia Atzmony, Newton, MA (US);
David J. Allen, Holliston, MA (US);
Dennis Flanagan, Milford, MA (US);
Hagit Brit-Artzi, Framingham, MA (US); Ron Arnan, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 998 days.

(21) Appl. No.: 11/394,536

(22) Filed: Mar. 31, 2006

(65) Prior Publication Data

US 2007/0239988 A1 Oct. 11, 2007

(51) Int. Cl.
*G06F 21/00* (2006.01)

(52) U.S. Cl. .................... 713/183; 726/7; 726/17; 726/18; 726/19; 713/165; 713/167; 713/170; 713/178

(58) Field of Classification Search .......... 713/183, 713/165, 167, 170, 178; 726/17, 18, 19, 726/7

See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,418,472 B1* | 7/2002 | Mi et al. | 709/229 |
| 2002/0112156 A1* | 8/2002 | Gien et al. | 713/156 |
| 2005/0100166 A1* | 5/2005 | Smetters et al. | 380/277 |
| 2005/0278549 A1* | 12/2005 | Torla et al. | 713/189 |
| 2005/0286746 A1 | 12/2005 | Silvester | |
| 2006/0036871 A1* | 2/2006 | Champine et al. | 713/183 |

FOREIGN PATENT DOCUMENTS

CN 1338841 A 3/2002

OTHER PUBLICATIONS

"Salt (cryptography)" [Online] Mar. 4, 2006 XP002452863 wikipedia Retrieved from the Internet: URL: http://en.wikipedia.org/Salt_(cryptography) >[retrieved on Sep. 27, 2007].
Tung, Brian, *Kerberos: Where Did It Come From, and Why?*, Copyright 2002, http://www.isi.edu/~brian/security/why_kerberos.html (8 pp).

* cited by examiner

*Primary Examiner*—Kambiz Zand
*Assistant Examiner*—Tongoc Tran
(74) *Attorney, Agent, or Firm*—Muirhead and Saturnelli, LLC (57) ABSTRACT

Restricting access to a device includes obtaining a passphrase for a user, obtaining access credentials for the user, obtaining a PIN value for the user, one-way encrypting at least the access credentials and the PIN using a secret key provided with the device. The user is allowed access to the device if the result of one-way encrypting equals the passphrase. The user is denied access to the device if the result of one-way encrypting does not equal the passphrase. The device may be a storage device. The access credentials may include a username that identifies the user and may include a role for the user. The access credentials may include a time period for which access is allowed. Access may be subsequently revoked in response to the current date and time being greater than the time period for which access is allowed.

20 Claims, 6 Drawing Sheets

ACCESSING DATA STORAGE DEVICES

BACKGROUND OF THE INVENTION

1. Technical Field

This application relates to the field of computer storage devices, and more particularly to the field of selectively providing access to computer storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

In some cases, it may be necessary to provide access to a computer storage device for maintenance and/or reconfiguration of the computer storage device. However, since the type of access needed to be able to perform maintenance and/or reconfiguration is the same type of access that would allow a malicious user to damage the computer storage device and/or eliminate or corrupt data stored thereon, it is useful to be able to restrict the particular users that have the type of access needed to perform maintenance and/or reconfiguration of the computer storage device. One way to do this is to password protect the computer storage device and provide the password only to those users that are allowed to perform maintenance and/or reconfiguration on the computer storage device. However, at some point, it may become desirable to revoke access for at least some of the users that were previously given access. For example, a user that works for a company that maintains the storage device may leave that company. In addition, authorized users may inadvertently (or otherwise) divulge a password to a malicious user who may then use the password to gain access and damage the storage device and/or destroy or corrupt the data.

One way to address this difficulty is to connect (e.g., via a communications cable, the Internet, etc.) each of the storage devices to a central security device that manages security/access for all of the storage devices and that reconfigures and revokes users' passwords that allow access to the storage devices. In instances where it is desirable to revoke a user's access or in instances where an authorized user has divulged a password, the central security device, coupled to the storage device, may change/revoke the effected password and then notify authorized users of the change. However, such a central security device may be impractical for a number of reasons, not the least of which is the fact that it may be difficult to connect all storage devices to the central security device.

It is desirable to address the security issues that arise when passwords for accessing security devices need to be changed/revoked without having to provide remote connections to the storage devices.

SUMMARY OF THE INVENTION

According to the present invention, restricting access to a device includes obtaining a passphrase for a user, obtaining access credentials for the user, obtaining a PIN value for the user, one-way encrypting at least the access credentials and the PIN using a secret key provided with the device, allowing access to the device if the result of one-way encrypting equals the passphrase, and denying access to the device if the result of one-way encrypting does not equal the passphrase. The device may be a storage device. The access credentials may include a username that identifies the user and a role for the user. The access credentials may include a time period for which access is allowed. Restricting access to a device may also include, after allowing access, subsequently revoking access in response to the current date and time being greater than the time period for which access is allowed. Restricting access to a device may also include obtaining time/date data indicative of a current date and time and one-way encrypting the time/date data along with the access credentials and the PIN using the secret key. Restricting access to a device may also include, after allowing access, subsequently revoking access in response to the current date and time being greater than the time period for which access is allowed. Obtaining the passphrase may include the user presenting at least one of: a smartcard, a memory stick, a floppy disk, and a CD or may include the user typing in the passphrase. Restricting access to a device may also include obtaining a device ID indicative of the device being accessed and one-way encrypting the device ID along with the access credentials and the PIN using the secret key. The secret key may be provided at the device in tamper-proof hardware.

According further to the present invention, constructing a passphrase for a user to gain access to a device includes obtaining a username that identifies the user, obtaining a PIN for the user, obtaining an expected time of access for the device, obtaining an identifier that identifies the device, and one-way encrypting the username, the PIN, the expected time of access, and the identifier using a secret key to provide the passphrase. The device may be a storage device. Constructing a passphrase for a user to gain access to a device may include storing the passphrase in a computer-readable medium. The computer readable medium may be one of: a smartcard, a memory stick, a floppy disk, and a CD. A computer readable medium having computer executable instructions may be provided for performing the steps described herein.

According further to the present invention, a computer storage device includes a plurality of disk drives, a plurality of disk adapters coupled to the disk drives, a memory coupled to the plurality of disk adapters, a plurality of host adapters, coupled to the disk adapters and the memory, that communicate with host computers to send and receive data to and from the disk drives and a service processor director, coupled to the memory, that restricts access to the storage device by obtaining a passphrase for a user, obtaining access credentials for the user, obtaining a PIN value for the user, one-way encrypting at least the access credentials and the PIN using a secret key provided with the storage device, allowing access to the storage device if the result of one-way encrypting equals the passphrase, and denying access to the storage device if the result of one-way encrypting does not equal the passphrase. The access credentials may include a username that identifies the user and a role for the user and/or may include a time period for which access is allowed.

According further to the present invention, a computer readable medium has computer executable instructions for performing any of the steps described herein.

According further to the present invention, a system has at least one processor that performs any of the steps described herein.

DETAILED DESCRIPTION OF VARIOUS EMBODIMENTS

Figure 1:
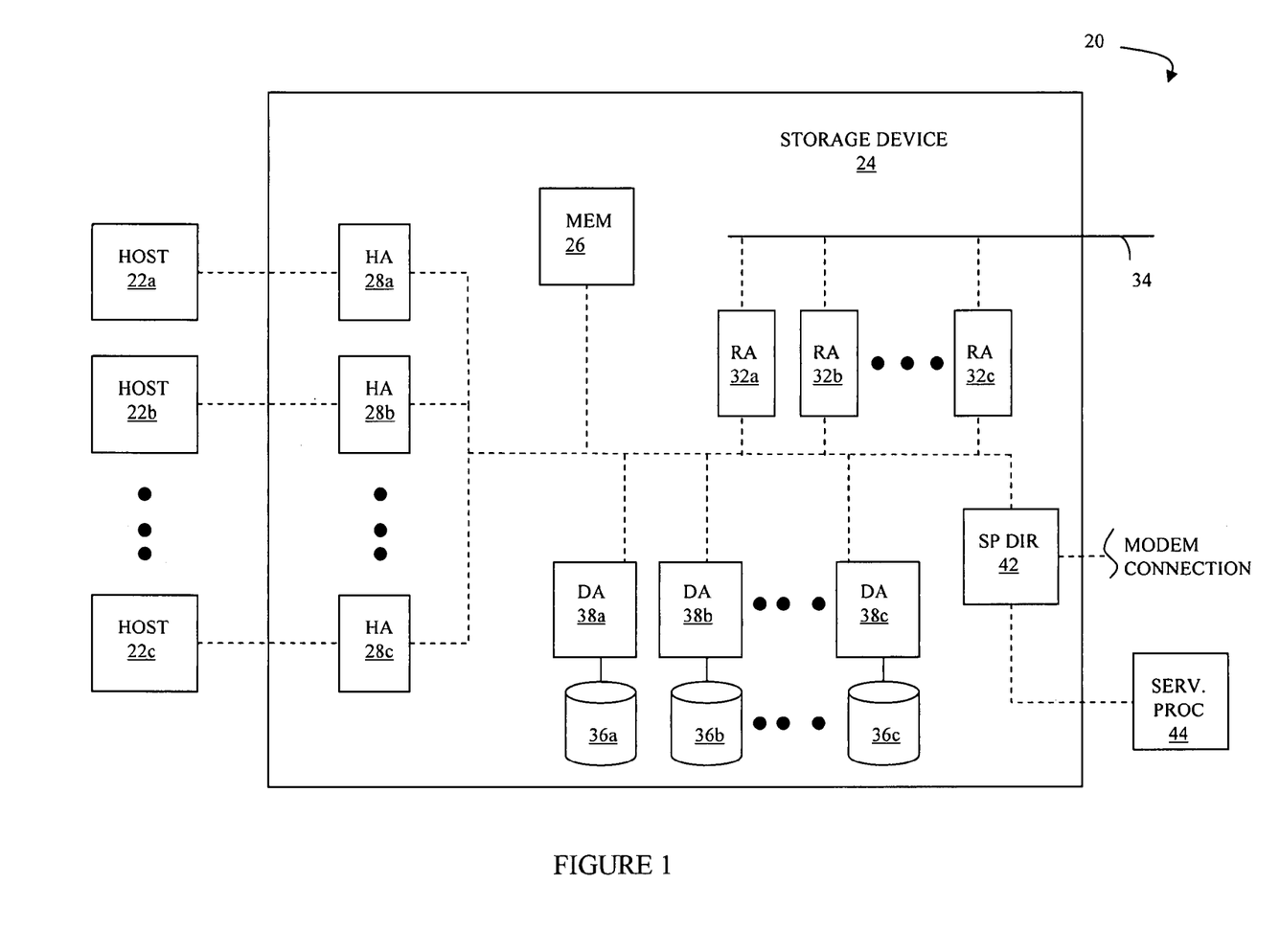
FIG. 1 is a schematic diagram showing a plurality of hosts coupled to a data storage device with a service processor used in connection with the system described herein.

Referring to FIG. 1, a diagram 20 shows a plurality of hosts 22a-22c coupled to a data storage device 24. The data storage device 24 includes an internal memory 26 that facilitates operation of the storage device 24 as described elsewhere herein. The data storage device also includes a plurality of host adaptors (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more RDF adapter units (RA's) 32a-32c. The RA's 32a-32c are coupled to an RDF link 34 and are similar to the HA's 28a-28c, but are used to transfer data between the storage device 24 and other storage devices (not shown) that are also coupled to the RDF link 34. The storage device 24 may be coupled to addition RDF links (not shown) in addition to the RDF link 34.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c, and a cache for data fetched from one or more of the disks 36a-36c. Use of the memory 26 is described in more detail hereinafter.

The storage device 24 may also include a service processor director 42 that communicates with and controls components of the storage device 24 to modify the configuration thereof. For example, the service processor director 42 may be used to configure local and remote data mirroring, may provide access to various system functions such as disk erasing, and, generally, may provide relatively thorough and complete access to the storage device 24 and components thereof to facilitate maintenance, configuration, etc.

The service processor director 42 may be provided with a modem connection that allows remote access to the storage device 24 through the service processor director 42. Using the modem connection, it may be possible for a remote technician to perform maintenance, reconfiguration, etc. to the storage device 24. In an embodiment herein, the modem connection into the service processor 42 is restricted to the manufacture of the storage device 24. Of course, other access rules are possible so that, for example, it is possible to provide access through the modem connection to a plurality of trusted users.

The service processor director 42 may be coupled to a service processor 44 that interfaces with the service processor director 42 to provide access to allow maintenance, reconfiguration, etc. of the storage device 24. In an embodiment herein, the service processor 44 may be implemented using a conventional laptop computer running the Windows® operating system. The service processor 44 may be coupled to the service processor director 42 in any appropriate fashion, such as by conventional data communication means. In some embodiments, a secure, tamper-proof, connection may be used between service processor 44 and the service processor director 42. The service processor 44 may be built into the storage device 24 so that access to the service processor 44 may require access to the storage device 24 (e.g., via a locked cabinet). In some embodiments, the modem connection may be provided through the service processor 44 rather than through the service processor director 42.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in an appropriate storage medium and executed by one or more processors.

Figure 2:
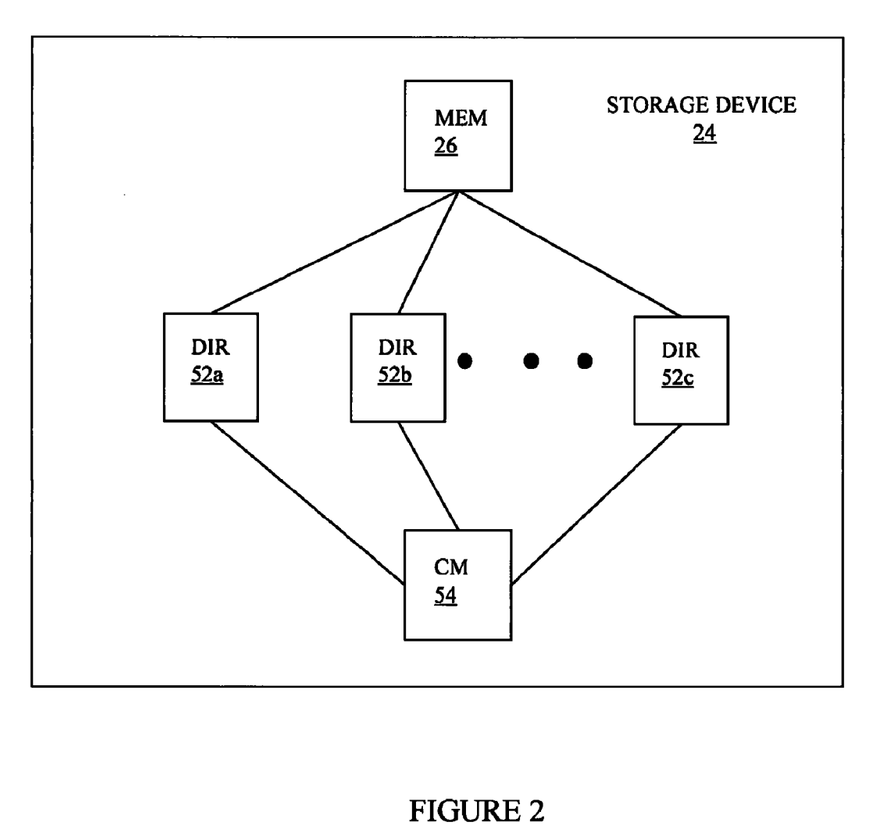
FIG. 2 is a schematic diagram showing a storage device, memory, a plurality of directors, and a communication module according to the system described herein.

Referring to FIG. 2, a storage device 24 is shown having a plurality of directors 52a-52c coupled to the memory 26.

Each of the directors 52a-52c represents one of the HA's 28a-28c, RA's 32a-32c, DA's 38a-38c, or the service processor director 42. In an embodiment disclosed herein, there may be up to sixty-four directors coupled to the memory 26. Of course, for other embodiments, there may be a higher or lower maximum number of directors that may be used.

The storage device 24 includes an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

Figure 3:
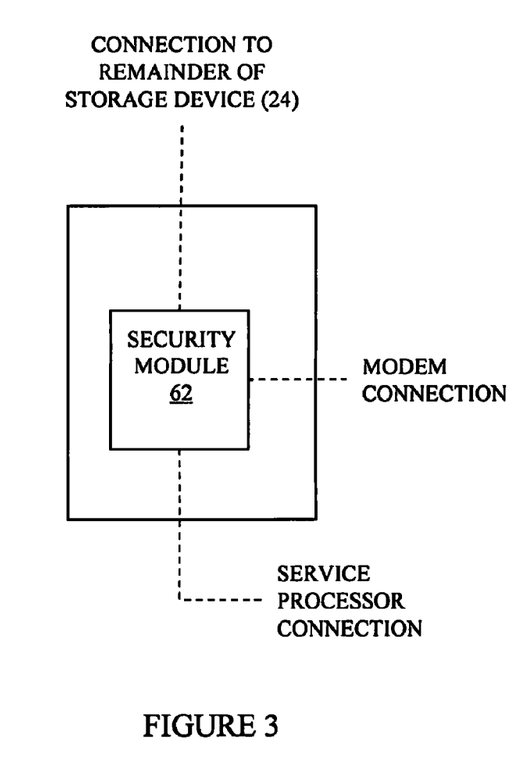
FIG. 3 is a diagram illustrating a security module that is provided as part of a service processor director according to the system described herein.

Referring to FIG. 3, the service processor director 42 is shown in more detail as including a security module 62. Of course, the service processor director 42 may contain other components besides the security module 62 that provide functionality other than security. However, the focus of the discussion herein is the security module 62 and thus other components of the service processor director 42 are not shown. The security module 62 restricts access to the storage device 24 for connections coming through the modem connection and/or the connection for the service processor 44. Therefore, all maintenance, reconfiguration, etc. commands as well as system inquiries that are made through either the modem connection or the service processor connection to the service processor director 42 pass through and are vetted by the security module 62.

In an embodiment herein, the security module 62 may be implemented using a processor and appropriate software. However, it will be appreciated by one of ordinary skill in the art that the functionality described elsewhere herein for the security module 62 may be implemented using any appropriate combination of computer software and/or hardware. Note also that the security module 62 does not necessarily need to be implemented within the service processor director 42 and may, instead, be implemented at any appropriate access point for the storage device 24, such as the service process 44. Of course, if the security module 62 is implemented at a user access point that is not also an access point for the modem connection, then separate security provisions may need to be made for the modem connection or, alternatively, the modem connection may be made through the service processor 44. Note also that the security module 62 may be implemented using or in conjunction with an operating system security system, such as built in security features of the Windows® operating system. In some embodiments, a username that is encoded into a passphrase (discussed elsewhere herein) is the same username that the user uses to log in to the computer operating system.

Note that a user may also be provided with a particular role that controls the type and extent of access to the storage device 24 provided to the user. In some instances, it may be desirable to provide a user with limited access while in others a user may need to be given extensive access in order to be able to perform the task(s) for which the user was given access. The role may be encoded into the passphrase so that, when the user presents the passphrase, the role for that user in connection with accessing the storage device is also defined. Thus, it should be understood that reference herein to username also may also include, where appropriate, an optional role for the user.

Figure 4:
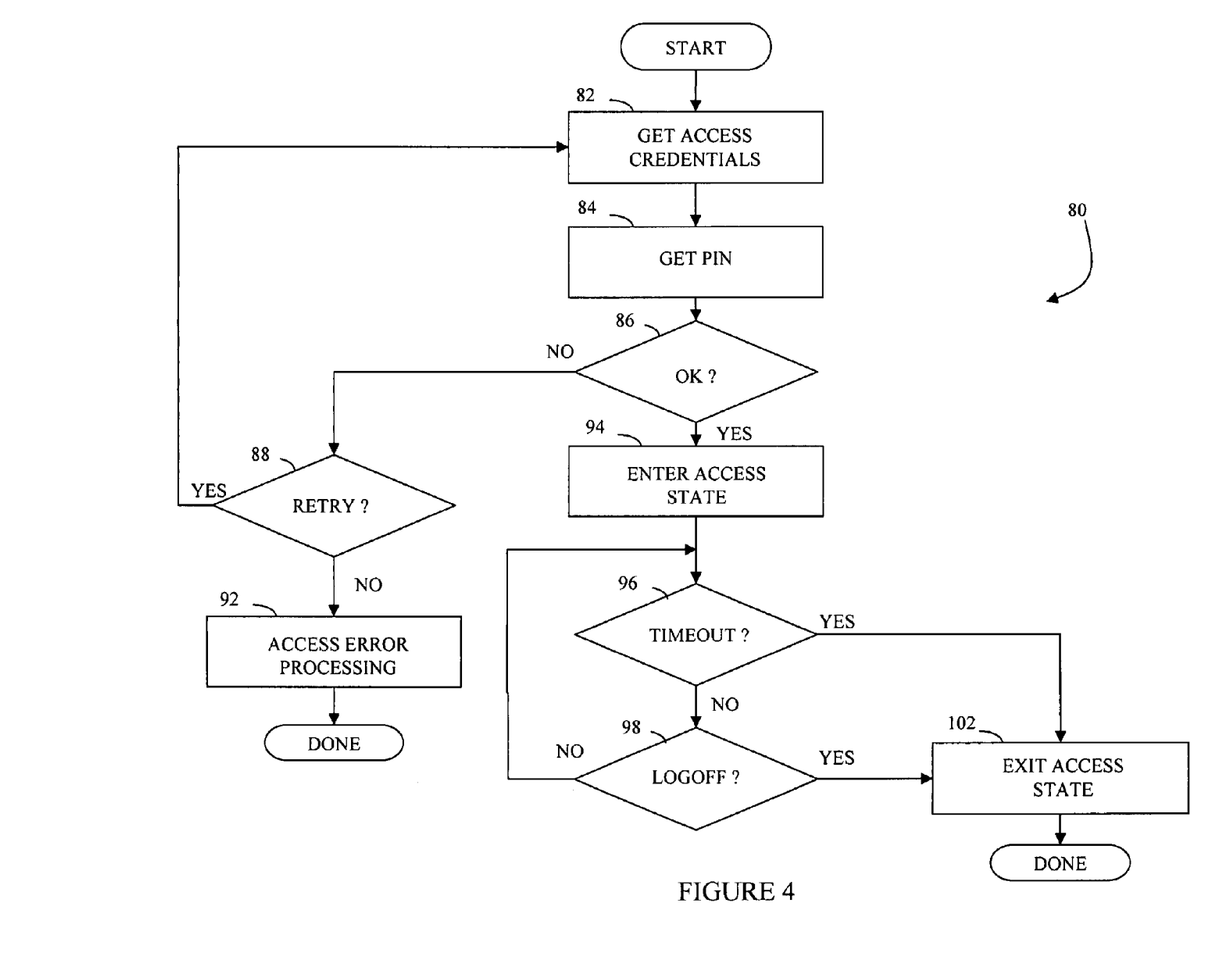
FIG. 4 is a flowchart illustrating processing performed by a security module in connection with determining whether to grant a user access to a storage device according to the system described herein.

Referring to FIG. 4, a flow chart 80 illustrates steps performed by the security module 62 in connection with granting and revoking access to the storage device 24. Processing begins at a first step 82 where a user is prompted for access credentials. In an embodiment herein, the access credentials include a user passphrase and a username that identifies the user. The passphrase and/or username may be entered manually by the user (e.g., typed by the user at the service processor 44) or provided to the security module 62 by some other means, such as a floppy disk, a CD, a smart card, a memory stick, etc. The username allows the security module 62 to grant access to only the user identified by the username. In an embodiment herein, the username may be encoded into the passphrase, as discussed in more detail elsewhere herein.

Following the step 82 is a step 84 where a user is prompted for a personal identification number (PIN). In an embodiment herein, the PIN is also encoded into the passphrase and is used as a check to protect against the possibility of an unauthorized user obtaining the passphrase and username and gaining unauthorized access to the storage device 24. As discussed elsewhere herein, a user can not gain access to the storage device 24 without also having the proper PIN value. The PIN protects against unauthorized access since an unauthorized user who obtains the username and passphrase may not also obtain the PIN, which may be known only by the authorized user (and perhaps the entity that issued the passphrase). The combination of the passphrase and the PIN may be deemed a two-factored password since it encompasses both what the user has (the passphrase) and what the user knows (the PIN).

Following the step 84 is a test stepped 86 where the security module 62 determines if the passphrase, username, and PIN entered at the steps 82, 84 are acceptable for granting the user identified by the username access to the storage device 24. The processing performed at the step 86 is discussed in more detail elsewhere herein. If it is determined at the test step 86 that the user should not be granted access, then control transfers from the test step 86 to a test step 88 which determines if the user should be allowed a retry. In some cases, the system may allow the user a certain number of retries (e.g. three) to account for the possibility that the user incorrectly typed his PIN or somehow other information like the username and/or the passphrase was entered incorrectly. The number of retries and whether to grant any retries at all is based on whatever security policy adopted for the system.

If it is determined that the test step 88 that the user is to be allowed a retry, then control transfers from the test step 88 back to the step 82 to reprompt the user for access credentials. Otherwise, if it is determined at the test step 88 that the user is not to be allowed a retry, then control transfers from the test step 88 to a step 92 where access error processing is performed. The processing performed at the step 92 depends upon the policies adopted for the system and may include, for example, displaying a message to the user and requiring that a certain amount of time pass before the user can attempt to access the system again. Of course, any other type of access error processing may be performed at the step 92 consistent with the policy adopted for the system, if any. Following the step 92, processing is complete.

If it is determined at the test step 86 that the access credentials and PIN provided at the steps 82, 84 are acceptable, then control transfers from the test step 86 to a step 94 where the system enters an access grant state for the user. While the system is in the access grant state, the user is allowed to access the storage device 24 through the service processor director 42 (or through whatever access point is provided for the security module 62). In some embodiments, after the system enters the access state at step 94, the user may be required to separately log in to the system and then the log into any application the user wishes to use. In these embodiments, entering the access state at the step 94 may be a precursor to allowing a user to log into the system. In other embodiments, entering the access state at the step 94 is part of the log on process so that the user does not need to separately log in to both the system and the application after entering the access state at the step 94.

Following the step 94 is a test step 96 which determines if the system has timed out. In an embodiment herein, the system may time out if a certain amount of idle time has passed after the user has entered the access state at the step 94. Providing for a time out prevents a situation where an authorized user accesses the storage device 24 and subsequently forgets to log out, thus providing an opportunity for unauthorized users to access storage device 24. In an embodiment herein, the system may time out after fifteen minutes have passed with no user keyboard input at the service processor 44, but of course other timeout values may be used.

In an embodiment herein, another type of timeout may also occur at the step 96. The other type of timeout involves part of the passphrase that may include information indicating the allowed service time (allowed access time) for the user. That is, the passphrase may indicate that the user is only allowed access to the storage device 24 between a first time and a second time. For example, the user may be allowed access to the storage device 24 for only a twenty-four or a forty-eight hour period starting on a particular date. Once this time period has passed, the user may no longer be allowed access to the storage device 24 even though the user otherwise has valid credentials and a valid PIN. Accordingly, for embodiments where the passphrase includes a time limit for the time which the user is allowed access to the storage device 24, the test at the step 96 may represent a determination of whether the time for which the user is allowed access has passed.

In some embodiments, the other type of time out described above is not used so that, once the user logs into the system and remains active, the user is not exited from the access state. Of course, as discussed elsewhere herein, even if the other type of time out is not used once the user logs in to the system, it is still possible to use time criteria to determine whether to grant access to the user in the first place.

If it is determined at the test step 96 that a timeout has not occurred, then control transfers from the test step 96 to a test step 98 which determines if the user has logged off of the system. If not, then control transfers back to the test step 96 to determine if a timeout has occurred. Thus, while a user is accessing the system, the system is continuously determining if the user has either timed out or if the user has logged off.

If it is determined at the test step 96 that a timeout has occurred or if it is determined at the test step 98 that the user has logged off, then control transfers from either the step 96 or the step 98 to a step 102 where the system exits the access state. Once the system has exited the access state at the step 102, the user may no longer have access to the storage device 24. In some embodiments, the user may be allowed to reestablish access while in other embodiments the user may not. In embodiments where the access state is tied to the user logging in to or out of the system, exiting the access state at the step 102 may represent the user logging out of some part of the system (e.g., logging out of the operating system). Following the step 102, processing is complete.

Figure 5:
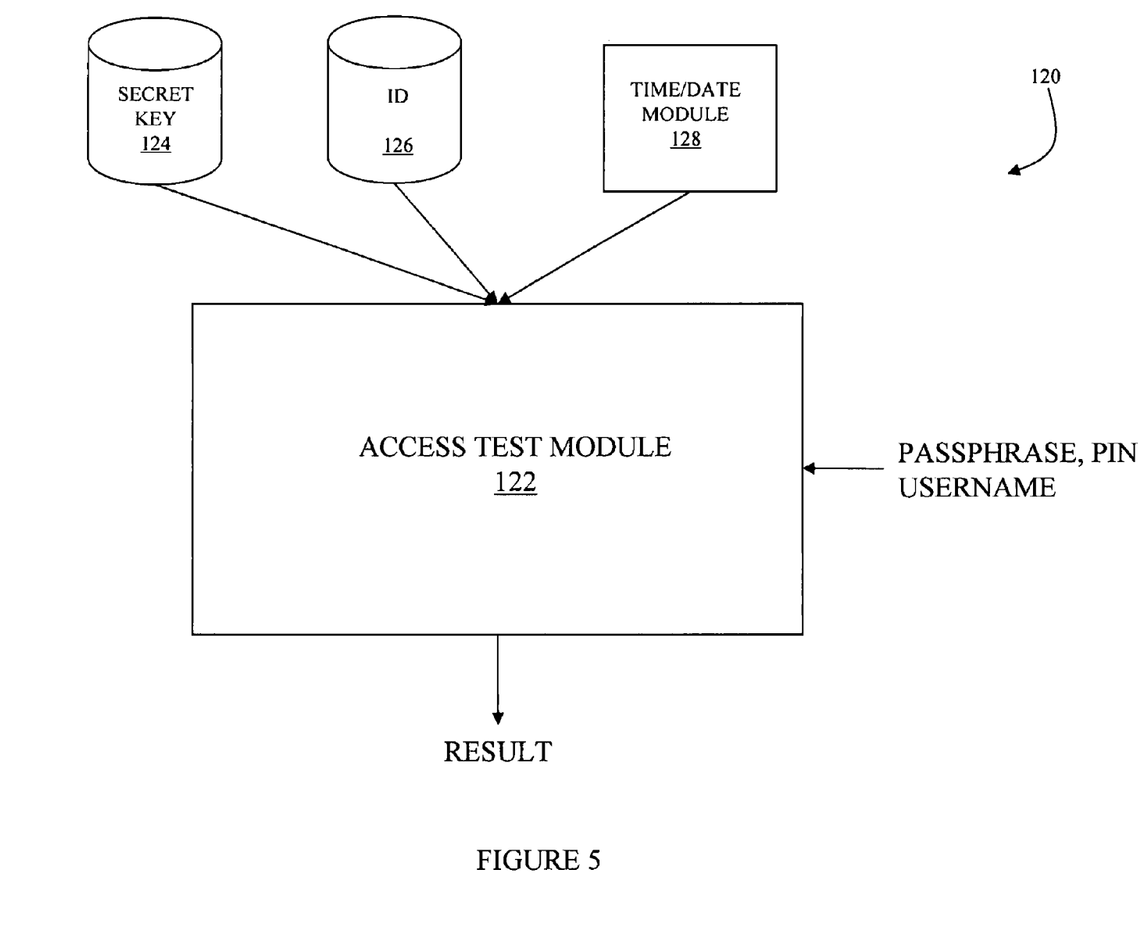
FIG. 5 is a diagram illustrating components of a security module according to the system described herein.

Referring to FIG. 5, a diagram 120 illustrates components of the security module 62 that may be used to perform the test at the step 86 to determine if a user should be granted access. An access test module 122 receives the passphrase, username (and possibly user role), and PIN along with other information to generate a result indicating whether a particular user corresponding to the username should be granted access. The access test module 122 also receives a secret key 124 a storage device ID 126 and the time and date from a time and date module 128.

The secret key 124 may be stored within the storage device 24 in a way that does not allow access to the secret key 124 except by the service processor director 42 (or whichever device is hosting the security module 62) and/or other authorized devices/users. It is not expected that a user presenting a passphrase would have direct access to the secret key. In an embodiment herein, the secret key 124 may be stored using tamper-proof hardware located within the storage device 24. In some embodiments, each of the different storage devices provided by a manufacturer may have a unique secret key. In other embodiments, all of the storage devices from a manufacture may have the same secret key. In still other embodiments, groups of storage devices have the same secret key while other storage devices have a different secret key. The distribution of secret keys is a security policy decision. The more storage devices that share the same secret key, the easier it is to administer the system. However, providing different storage devices with different secret keys increases the level of security provided by the system. As discussed elsewhere herein, the secret key 124 is also known by an entity that generates the passphrase for the user which, in an embodiment herein, may be the manufacture of the storage device 24 or some other entity that manages maintenance/reconfiguration of the storage device 24.

The identifier 126 may be used to uniquely identify the storage device 24 to prevent a user who is authorized to access only a particular storage device from (inadvertently or otherwise) accessing other storage devices. In some embodiments, each storage device may be provided with a unique identifier. In other embodiments, groups of storage devices may share an identifier so that, for example, a plurality of storage devices at a single site may have the same identifier. In an embodiment herein, the identifier 126 is also the serial number of the storage device 24 issued by the manufacturer of the storage device 24.

The time and date module 128 may be used to obtain the current time and date and provide that information to the access test module 122. In an embodiment herein, the time and date module 128 accesses one of a plurality of well-known Web sites to obtain time information. Obviously, the time and date module 128 may obtain time information from any source, including an internal clock of the storage device 24. However, to the extent that the accuracy of the information from the time and date module 128 can be ensured, the system is more secure since ensuring the time and date information prevents an unauthorized user from modifying the system time and date information for the storage device 24 in an attempt to use an "old" passphrase. There are a number of well-known mechanisms that may be employed to help ensure that the time and information from the time and date module 124 are accurate.

Figure 6:
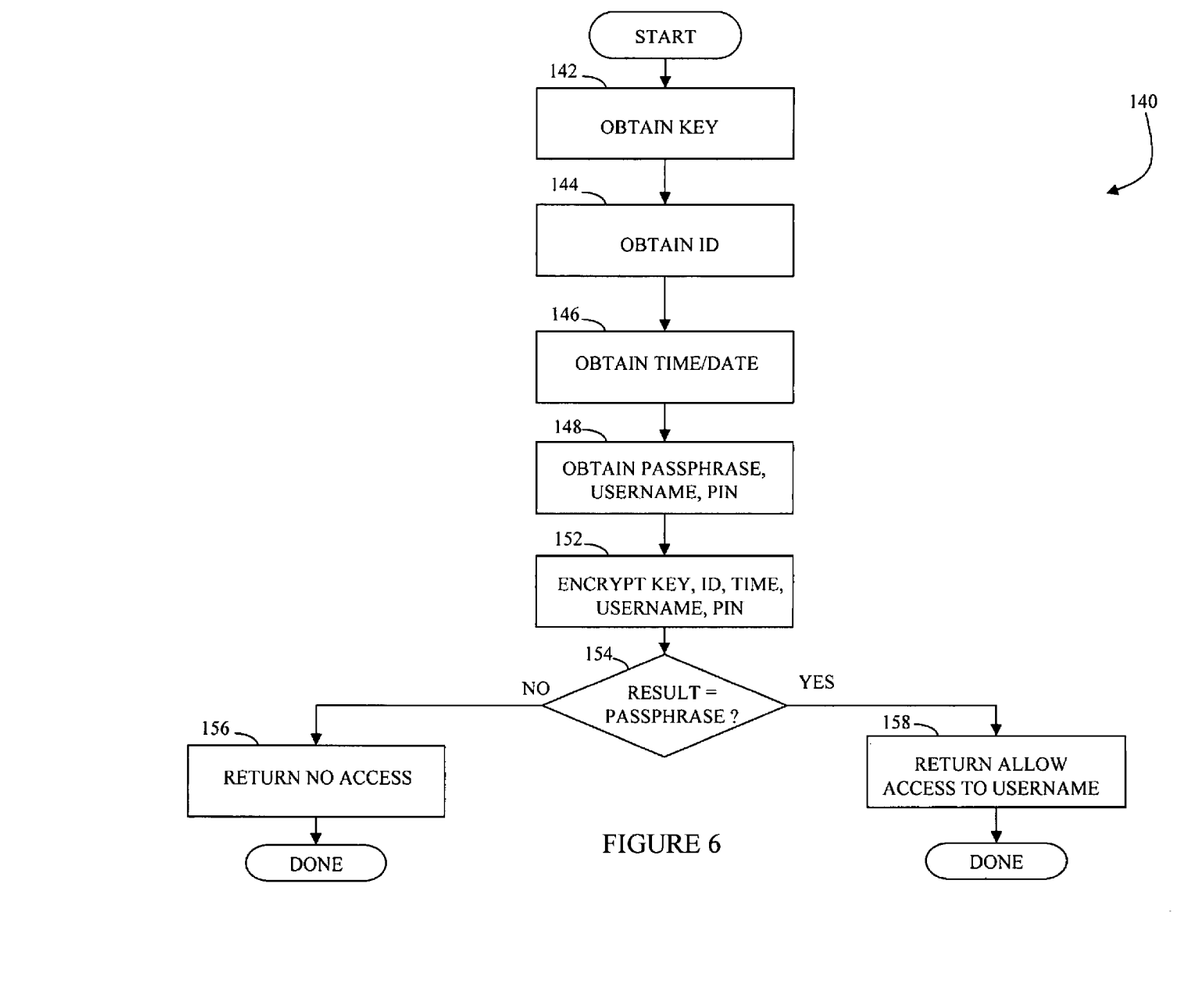
FIG. 6 is a flowchart illustrating steps performed in connection with determining whether a user has provided an appropriate passphrase for gaining access to a storage device according to the system described herein.

Referring to FIG. 6, a flowchart 140 illustrates steps performed by the access test module 122 in order to determine whether to grant access to a user. Processing begins a first step 142 where the access test module 122 obtains the secret key associated with the storage device 24. As discussed elsewhere herein, the secret key associated with the storage device 24 may be stored in tamper-proof hardware provided within the storage device 24. Following the step 142 is a step 144 where the access test module 122 obtains the ID of the storage device 24. Following the step 144 is a step 146 where the access test module 122 obtains the current date and time from the date and time module 128. As discussed elsewhere herein, improving the reliability of the date and time improves the security of the system.

Following the step 146 is a step 148 where the access test module 122 obtains the passphrase, username (and possibly role), and PIN. In an embodiment herein, the user may present a storage medium such as a smart card or memory that contains the passphrase and (possibly the role) and may manually type in the username in PIN into the service processor 44 or other appropriate device. In other embodiments, the user may manually type in the passphrase and/or the username instead of, or in addition to, providing that information using a storage medium. In other embodiments, the user may type in only the PIN.

Following the step 148 is a step 152 where a one-way encryption is performed using the secret key, the ID, the date and time, the username (and possibly role), and the PIN. In an embodiment herein, the one-way encryption performed at the step 152 is a one-way mathematical function that generates a deterministic output value from a particular set of input values such that it is mathematically difficult, if not impossible, to ascertain the input values given only the output value. Thus, an unauthorized user who obtains a passphrase may not use it to ascertain the secret key or any other information encoded into the passphrase.

There are a significant number of types of one-way encryption functions that may be used, including encryption of the ID, the date and time, the username (and possibly role), and the PIN using the secret key, encryption of the ID, the date and time, the username (and possibly role), the PIN and the secret key, certain types of one-way hash functions, digital signatures, etc. The system described herein does not depend upon any specific type of one-way encryption function being used, so long as it the one-way encryption 1) allows verification that the entity that constructed the passphrase is in possession of the secret key and 2) the secret key can not be ascertained (or at least practically ascertained) from the passphrase. Note that, for the system provided herein, the user is not given the secret key except as it is encrypted in or used to encrypt the passphrase.

Following the step 152 is a test step 154 which determines if the result of the one-way encryption performed at the step 152 equals the passphrase. If not, then control transfers to the step 156 where the access test module returns an indicator indicating that no access is to be provided to the user. Following step 156, processing is complete. On the other hand, if it is determined at the test step 154 that the result of the hash performed at the step 152 equals the passphrase, then control transfers from the test step 154 to a step 158 where the access test module 122 returns an indicator indicating that the user corresponding to the username provided at the step 148 is allowed access to the storage device 24. If a role is used, then the indicator provided at the step 148 also indicates the role for the user. Following the step 158, processing is complete.

In an embodiment herein, the system may round the time and date value obtained at the step 146 to the nearest day. Similarly, the passphrase may be encoded with a time and date value rounded to the nearest day. In this way, it is possible to have the time value obtained at the step 146 be equal to the time value encoded into the passphrase. Of course, different rounding may be used so that, for example, time values may be rounded to the nearest week, the nearest two-day period, etc. In addition, it is possible to encode the passphrase with the expected time of service (rather than the current time) so that, when the user presents the passphrase to the storage device 24, the time encoded in the passphrase can match the time of service. Note also that the time obtained at the step 146 may be used in connection with the test for a timeout at the step 96 discussed above in connection with the flowchart 80 of FIG. 4 to determine if the allowed time of access has passed. Following the step 158, processing is complete.

Figure 7:
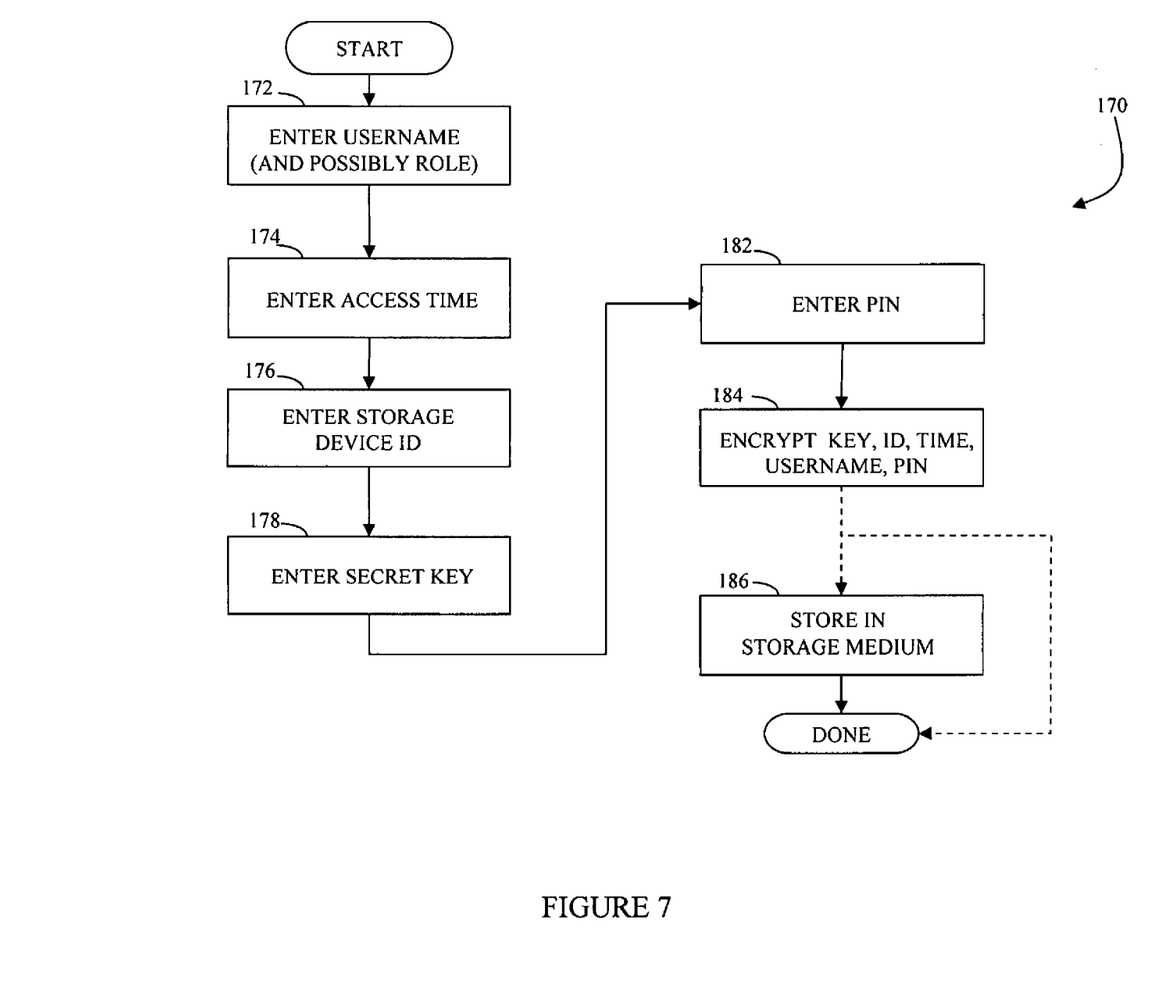
FIG. 7 is a flowchart illustrating steps performed in connection with generating a passphrase for a user to gain access to a storage device according to the system described herein.

Referring to FIG. 7, a flowchart 170 illustrates steps performed in connection with generating a passphrase for a user to access the storage device 24. In an embodiment herein, the passphrase may be generated by the manufacture of the storage device 24 and provided to users on an as needed basis. It is also possible to have an entity other than the manufacture be responsible for maintenance/reconfiguration of the storage device 24 and thus be responsible for generating passphrases. In embodiments where the time value is included in the passphrase, then users are given a passphrase that has encoded therein an allowed time for the users to access to the storage device 24.

Processing begins at a first step 172 where the username is entered. Entering the username at the step 172 may be performed by any appropriate means, including having the user type and his or her username or by accessing a database of authorized users that contains the username. If roles are employed, then the role for the user may also be entered at the step 172. Following the step 172 is a step 174 when the expected access time of the storage device 24 is entered. As discussed elsewhere herein, the expected access time may be encoded into the passphrase so that the passphrase allows access to the storage device 24 only for the specified time rather than at any time. Following the step 174 is a step 176 where the ID of the storage device 24 is entered. Following the step 176 is a step 178 where the secret key is entered. In an embodiment herein, the entity that generates the passphrase (for example, the manufacturer of the storage device 24) maintains the same secret key that is provided at the storage device 24. Just as with the secret key at the storage device 24, the secret key at the location where the passphrase is generated may be protected from unauthorized access/modification in some form using, for example, tamper-proof hardware, a vaulted computer, etc.

Following step 178 is a step 182 when the PIN is entered. In an embodiment herein, a user desiring access may choose his or her own PIN for each time the user accesses a storage device. In other embodiments, is possible to assign PIN values in an automatic fashion and then to report to the user the assigned PIN value. Following the step 182 is a step 184 where a passphrase is generated. Generating the passphrase at step 184 involves using the same (or similar) one-way encryption function used to test for the validity of the passphrase by the access test module 122. For example, in embodiments where a one-way hash function is used to test for the passphrase by the access test module 122, then the same one-way hash function may be used to generate the passphrase at step 184.

Note that it is possible to use a different function to generate the passphrase than is used to test the passphrase at the access test module. Note that it is also possible to use different keys for generation and testing. For example, using a public/private key pair, it is possible to generate the passphrase using a private key (by digitally signing the data of the passphrase, except the key, using the private key) and then verify the passphase at the storage device using the corresponding public key. An advantage to this is that it does not require special storage requirements for the secret key at the storage device 24 since the storage device 24 may use a non-secret public key to verify the digital signature.

Following the step 184 is an optional step 186 where the passphrase is stored in a computer readable storage medium, such as a smart card, a floppy disk, a CD, a memory stick, or any other appropriate computer readable storage medium. Of course, since the passphrase is simply a set of numbers/symbols, it is always possible to simply report the passphrase to the user and have the user to type in the passphrase at the storage device 24 when the user is requesting access. However, if the step 186 is executed, then the user may have a copy of the passphrase stored on a computer readable storage medium that the user may then present to the storage device 24 when the user desires access. Note also that it is possible to store the passphrase on a computer readable storage medium at the step 186 and still require the user type in the passphrase at the storage device 24. In that case, the computer readable storage medium may simply be for the purpose of providing a permanent copy of the passphrase in case the user loses or forgets it. Following step 186, processing is complete. Note that, if the step 186 is not executed, then following the step 184 processing is complete.

It is possible to provide other embodiments of the system described herein that encode only a subset of the information that is illustrated herein as being encoded in to the passphrase. For example, it is possible to omit the ID and/or to omit the access time and/or to omit the username, etc. In addition, it is also possible to add additional information to be encoded into the passphrase that is not mentioned in connection with the flowchart 170 in FIG. 7. Any possible additional information may be added to the passphrase. Examples are the types of additional information which may be added include location information, information indicating the nature of the service to be performed by the user, etc.

While the invention has been disclosed in connection with various embodiments, modifications thereon will be readily apparent to those skilled in the art. Accordingly, the spirit and scope of the invention is set forth in the following claims.

What is claimed is:

1. A method of restricting access to a device, comprising:
obtaining a passphrase for a user;
obtaining access credentials for the user;
obtaining a PIN value for the user;
obtaining time/date data indicative of a date and time;
one-way encrypting at least the access credentials, the time/date data and the PIN using a secret key provided with the device, wherein the secret key is generated independently of the access credentials and the PIN value for the user and is provided on the device prior to an access attempt by the user, wherein the passphrase is generated using the secret key and is generated externally to the device and prior to the access attempt by the user, and wherein the secret key is not directly accessible to the user based on the passphrase used to access the device in the access attempt;
allowing access to the device if the result of one-way encrypting equals the passphrase; and
denying access to the device if the result of one-way encrypting does not equal the passphrase.

2. A method, according to claim 1, wherein the device is a storage device.

3. A method, according to claim 1, wherein the access credentials include a username that identifies the user and a role for the user.

4. A method, according to claim 1, wherein the access credentials include a time period for which access is allowed.

5. A method, according to claim 4, further comprising:
after allowing access, subsequently revoking access in response to the current date and time being greater than the time period for which access is allowed.

6. A method, according to claim 1, wherein the time/date data is indicative of a current date and time.

7. A method, according to claim 6, further comprising:
after allowing access, subsequently revoking access in response to the current date and time being greater than the time period for which access is allowed.

8. A method, according to claim 1, wherein obtaining the passphrase includes the user presenting at least one of: a smartcard, a memory stick, a floppy disk, and a CD.

9. A method, according to claim 1, wherein obtaining the passphrase includes the user typing in the passphrase.

10. A method, according to claim 1, further comprising:
obtaining a device ID indicative of the device being accessed; and
one-way encrypting the device ID along with the access credentials and the PIN using the secret key.

11. A method, according to claim 1, wherein the secret key is provided at the device in tamper-proof hardware.

12. A computer readable medium having computer executable instructions for performing the steps recited in claim 1.

13. A method of constructing a passphrase for a user to gain access to a device, comprising:
obtaining a username that identifies the user;
obtaining a PIN for the user;
obtaining an expected time of access for the device;
obtaining an identifier that identifies the device; and
using a secret key to one-way encrypt the username, the PIN, the expected time of access, and the identifier to provide the passphrase, wherein the secret key is generated independently of the username, the expected time of access and the PIN for the user and is provided on the device prior to an access attempt by the user, wherein the passphrase is generated using the secret key and is generated externally to the device and prior to the access attempt by the user, and wherein the secret key is not directly accessible to the user based on the passphrase used to access the device in the access attempt.

14. A method, according to claim 13, wherein the device is a storage device.

15. A method, according to claim 13, further comprising:
storing the passphrase in a computer-readable medium.

16. A method, according to claim 15, wherein the computer readable medium is one of: a smartcard, a memory stick, a floppy disk, and a CD.

17. A computer readable medium having computer executable instructions for performing the steps recited in claim 13.

18. A computer storage device, comprising:
a plurality of disk drives;
a plurality of disk adapters coupled to the disk drives;
a memory coupled to the plurality of disk adapters;
a plurality of host adapters, coupled to the disk adapters and the memory, that communicate with host computers to send and receive data to and from the disk drives; and
a service processor director, coupled to the memory, that restricts access to the storage device by:
obtaining a passphrase for a user,
obtaining access credentials for the user,
obtaining a PIN value for the user,
obtaining time/date data indicative of a date and time,
one-way encrypting at least the access credentials, the time/date data and the PIN using a secret key provided with the storage device, wherein the secret key is generated independently of the access credentials and the PIN value for the user and is provided on the storage device prior to an access attempt by the user, wherein the passphrase is generated using the secret key and is generated externally to the storage device and prior to the access attempt by the user, and wherein the secret key is not directly accessible to the user based on the passphrase used to access the storage device in the access attempt, allowing access to the storage device if the result of one-way encrypting equals the passphrase, and denying access to the storage device if the result of one-way encrypting does not equal the passphrase.

19. A storage device, according to claim 18, wherein the access credentials include a username that identifies the user and a role for the user.

20. A storage device, according to claim 19, wherein the access credentials include a time period for which access is allowed.

\* \* \* \* \*